United States Patent [19]

Argandona

[11] Patent Number: 4,926,899
[45] Date of Patent: May 22, 1990

[54] TRANSITION CONDUIT SYSTEM FOR FUEL PUMP

[76] Inventor: Toby Argandona, 21221 Running Branch Rd., Diamond Bar, Calif. 91765

[21] Appl. No.: 409,080

[22] Filed: Sep. 19, 1989

[51] Int. Cl.⁵ .............................................. F16L 5/00
[52] U.S. Cl. ................................ 137/364; 137/234.6; 137/312
[58] Field of Search .................. 52/20; 137/363, 364, 137/234.6, 312, 381

[56] References Cited

U.S. PATENT DOCUMENTS

| | | | |
|---|---|---|---|
| 3,375,788 | 4/1968 | Solas et al. | 137/364 |
| 3,730,213 | 5/1973 | Bates | 137/364 |
| 4,269,240 | 5/1981 | Cutore | 137/363 |
| 4,335,740 | 6/1982 | Boley | 137/364 |
| 4,762,440 | 8/1988 | Argandona | 137/363 |

FOREIGN PATENT DOCUMENTS 2014669  8/1979  United Kingdom ................ 137/364

*Primary Examiner*—A. Michael Chambers
*Attorney, Agent, or Firm*—Boniard I. Brown

[57] ABSTRACT

Transition conduit piping arranged between an underground fuel flow pipe and an above-ground fuel pumping unit, includes a forty-five degree elbow attached to the side wall of a liquid spill-containment casing and a semi-flexible hose connected between the underground flow pipe and the forty-five degree elbow. Orientation of the transition piping is such that conduit pipe joints are readily accessible for observation or repair of leaking joints. The invention avoids earth contamination problems associated with undetected underground gasoline leaks.

22 Claims, 3 Drawing Sheets

TRANSITION CONDUIT SYSTEM FOR FUEL PUMP

BACKGROUND OF THE INVENTION

The present invention relates generally to gasoline service station equipment, and particularly to transitioning connections between an underground fuel storage tank and an above-ground fuel pumping apparatus.

Gasoline pumps are commonly located on raised concrete islands surrounded by pavement, and gasoline is delivered from an underground tank to the gasoline pumps through an underground pipe system extending to a point underneath the pumping island. This system includes a nominally horizontal main section and an upwardly curving end section for transition from an essentially horizontal attitude to a vertical attitude. A rectangular casing is embedded in a mass of concrete directly above the vertical portion of the upwardly curving pipe section, and the upper end of the pipe section extends to or through the bottom wall of the rectangular casing.

A vertically oriented safety valve is located within the casing in liquid connection to the vertical portion of the upwardly curving pipe section. The safety valve is designed to automatically close the pipeline in the event that an automotive vehicle should strike the above-ground pumping apparatus, which is located directly above the safety valve on the concrete island. The upper end of the safety valve housing has a narrowed annular neck section that will shear off in response to a horizontal striking force such as that generated when an automotive vehicle strikes the above-ground pumping apparatus. The safety valve includes an internal poppet valve element that is held open when the pumping apparatus is operating normally. When the upper end of the valve housing shears off, the poppet valve element is automatically biased to a closed position. This valve action prevents liquid fuel from flowing out of the pipe system onto the concrete where it could be ignited to possibly generate an explosive-type conflagration, or could seep into the ground.

During extended periods of service, leaks can sometimes develop in the underground piping system, particularly at certain pipe joints where the aforementioned upwardly curved piping section connects with the essentially horizontal underground pipe or the safety valve. The connection between the safety valve and the curved pipe section extends upwardly through the bottom wall of the aforementioned rectangular casing. If the leak occurs above the casing bottom wall, the casing will contain any liquid fuel that might tend to leak from the joint between the curved pipe section and the safety valve. The casing is equipped at its upper edge with an access plate that can be removed to permit a technician to inspect the joint between the curved pipe section and the safety valve. It thus becomes possible to repair a leaking joint within the casing.

However, pipe joints below the casing bottom walls and at the lower end of the curved pipe section are concealed or otherwise located underground a significant distance—e.g., approximately fifteen inches below the bottom wall of the rectangular casing. It thus becomes difficult to detect a leaking joint below the casing or at the lower end of the curved pipe section. Small quantities of gasoline leaking out of the earth-covered joint can, over time, cause significant ecological pollution damage. The gasoline can migrate through the earth to areas remote from the service station. Gasoline-contaminated earth is required by law to be dug up and hauled by truck to disposal sites in order to alleviate the effects of the underground leakage.

The upwardly curved transition pipe section is usually constructed of elastomeric or plastic materials reinforced with woven steel strands, such that the pipe section has limited flexibility. In order for the curved pipe section to make a ninety degree bend, the semi-flexible pipe section is required to be relatively long, such as twenty-four inches to thirty inches. The relatively long curved pipe section length results in the lower end of the curved pipe section being a substantial distance below ground level.

The underground gasoline storage tank is usually some distance away from the pumping station island, and often there is a distance of one hundred feet or more between the underground storage tank and the pumping station island. The nominally horizontal pipe between the underground tank and the upwardly curved pipe section is required to have an upward slope of at least one-eighth inch per foot of pipe so that liquid fuel will automatically drain back toward the tank, rather than from the tank toward the pumping apparatus. The required slope of the nominally horizontal pipe section causes the tank to be buried a considerable distance below the ground surface. Extensive excavation expense is therefore sometimes involved to repair leaks associated with the underground tank. The situation is aggravated by the fact that the upwardly curved pipe end section is required to be relatively long in the vertical direction.

The present invention provides a redesigned upwardly curved transition pipe section into an S-shaped transition pipe system having a relatively small vertical dimension. By reducing the vertical dimension of the transition piping, the depth of the underground fuel storage tank is reduced and the associated expenses of installation and removal are substantially reduced. This becomes especially important when it is necessary to excavate the area in an effort to locate and repair an underground leak.

The invention contemplates an underground transition conduit piping system wherein a liquid-tight casing is located in a concrete base and has a side connection with a generally S-shaped transition pipe, the transition piping being located within a hollow shroud attached to the casing side wall. The transition piping extends laterally and then downwardly from the casing in order to connect with the nominally horizontal main section of the underground piping system.

The "side-mount" character of the transition piping enables the associated pipe joints to be accessible from above ground, thereby enabling the detection and repair of leaking joints to be more easily accomplished without excavation or removal of the liquid-tight casing. Additionally, the vertical dimension of the transition piping is somewhat reduced, thereby reducing the required depth of the underground fuel tank.

DESCRIPTION OF A PREFERRED EMBODIMENT OF THE INVENTION

Figure 1:
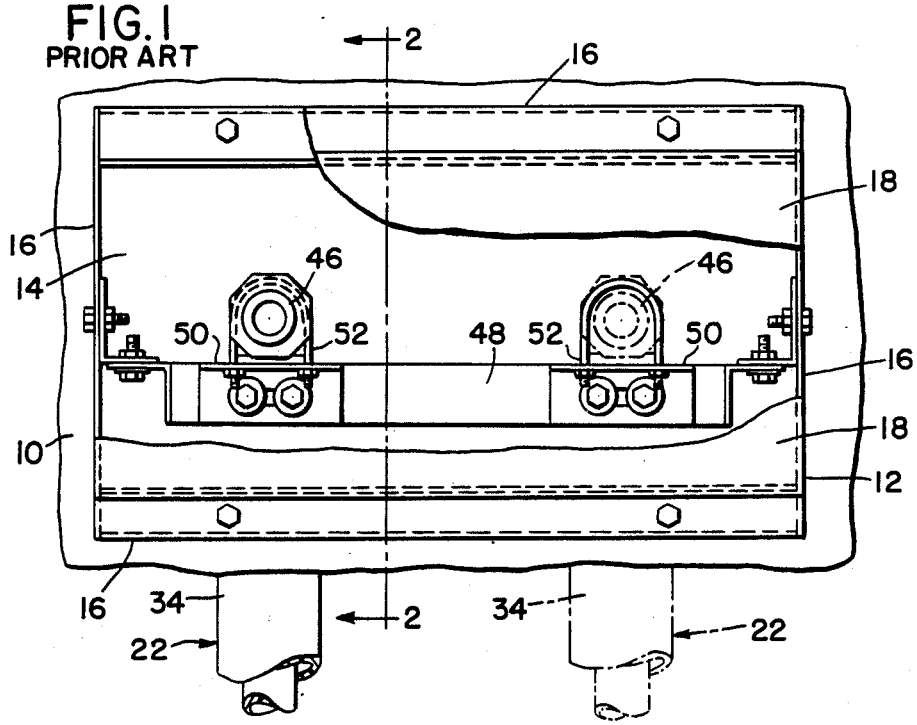
FIG. 1 is a top plan view of a prior art transition piping system for a gasoline pumping facility.
Figure 2:
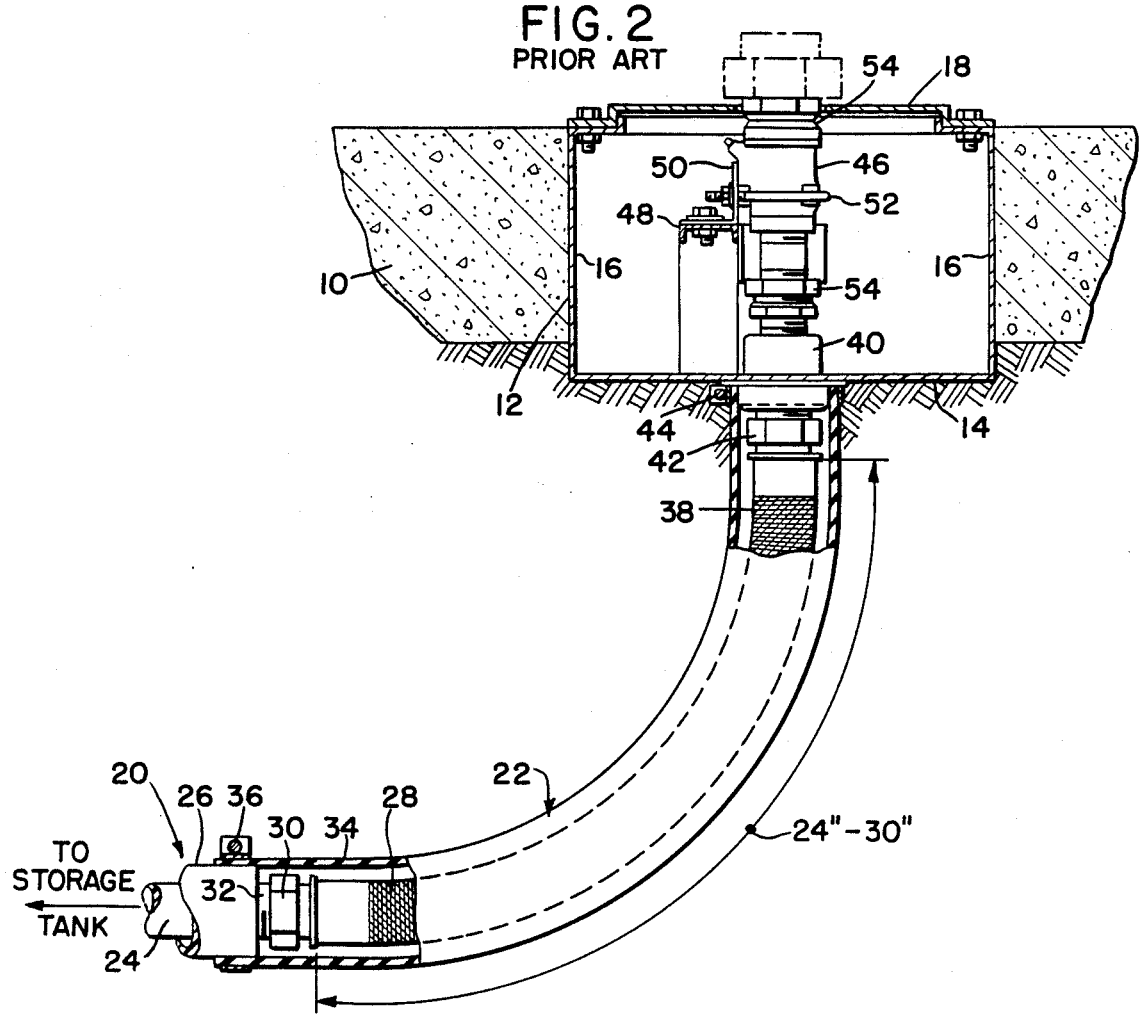
FIG. 2 is a sectional view taken on line 2—2 in FIG. 1.

FIGS. 1 and 2 show a prior art piping system utilized at gasoline service stations for conducting liquid gasoline from an underground storage tank to an aboveground pumping unit. The piping system comprises a concrete base 10 and a metal casing 12 embedded therein. The base 10 is part of a concrete island that supports a number of fuel pumping units. Typically, the concrete has a depth of about nine inches and the casing has a depth of about ten inches.

Casing 12 is a liquid-tight container structure having a bottom wall 14 and four upstanding side walls 16. A removable access plate 18 is attached to upper edge areas of the casing side walls.

Gasoline is drawn from an underground storage tank through a nominally horizontal main pipe section 20 and an upwardly curved transition pipe section 22. Pipe section 20 slopes upwardly in a left-to-right direction, as viewed in FIG. 2, at about one-eighth inch per foot of pipe. Pipe section 20 is a double walled pipe which includes a two-inch diameter inner pipe 24 and a three and one-half inch diameter outer pipe 26. During normal operations liquid flows only through the inner pipe, and the outer pipe serves only as a safety liquid containment device in the event of a rupture of the inner pipe.

Upwardly curved transition pipe 22 includes a composite semi-flexible hose 28 formed of elastomeric material reinforced with a woven steel sleeve structure. This semi-flexible hose is fluid-connected to main pipe 24 via an internally threaded swivel connector 30 that threads onto an externally threaded end fitting 32 on pipe 24. An elongated tubular elastomeric boot 34 extends along and about the semi-flexible hose 28 to form a device for liquid containment in the event of rupture of hose 28. The left (lower) end of boot 34 is clamped to the outer face of pipe 26 via a hose clamp 36.

Semi-flexible pipe 28 curves upwardly so that its downstream end 38 extends in a vertical direction, the pipe thus serving as a ninety degree transition from an essentially horizontal attitude to a vertical attitude. A hollow fitting or connector 40 is mounted on casing bottom wall 14 to receive the end of transition pipe 38; an internally threaded swivel connector 42 is carried on the lower end of fitting 40 to thread onto a threaded end of pipe 28. The upper (right) end of elastomeric boot 34 is clamped to the outer surface of fitting 40 via a hose clamp 44. Fitting 40 is permanently or otherwise sealably connected to casing bottom wall 14.

A normally-open valve 46 is arranged within casing 12 below access plate 18, and is supported on a transversely extending channel 48 by means of a flanged bracket 50 and U-clamp 52. A threaded flow coupling structure 54 connects valve 46 to fitting 40. Gasoline flows upwardly through valve 46 to a pumping apparatus (not shown) located in the space above access plate 18.

Valve 46 contains a spring-urged poppet valve element that is normally held in a flow-open position. The upper end portion of the valve housing has a knife-edged annular groove 54 extending therearound. In the event that the superjacent pumping apparatus should be impacted, as by an out-of-control automobile, a lateral force will be applied to the upper end of the valve housing, thereby causing the valve housing to be sheared off at annular neck 54. The spring mechanism within the valve housing will then automatically bias the poppet valve element to a flow-closed position. This action prevents liquid gasoline from flowing from the valve housing onto the pavement and possibly fueling a fire or explosion.

There are certain disadvantages resident in the prior art construction of FIGS. 1 and 2. As an example, the joints at 32, 34, 36 are located underground a considerable distance below casing bottom wall 14. Should a small leak develop at these joints, the leak will go undetected. Small liquid quantities can leak into the ground for considerable periods of time prior to being detected upon excavation of the earth below casing 12.

A similar undetected leaking condition can occur at the joints defined by components 42 and 44, these joints being located below casing wall 14 where they cannot be easily examined for visible signs of leakage.

Figure 3:
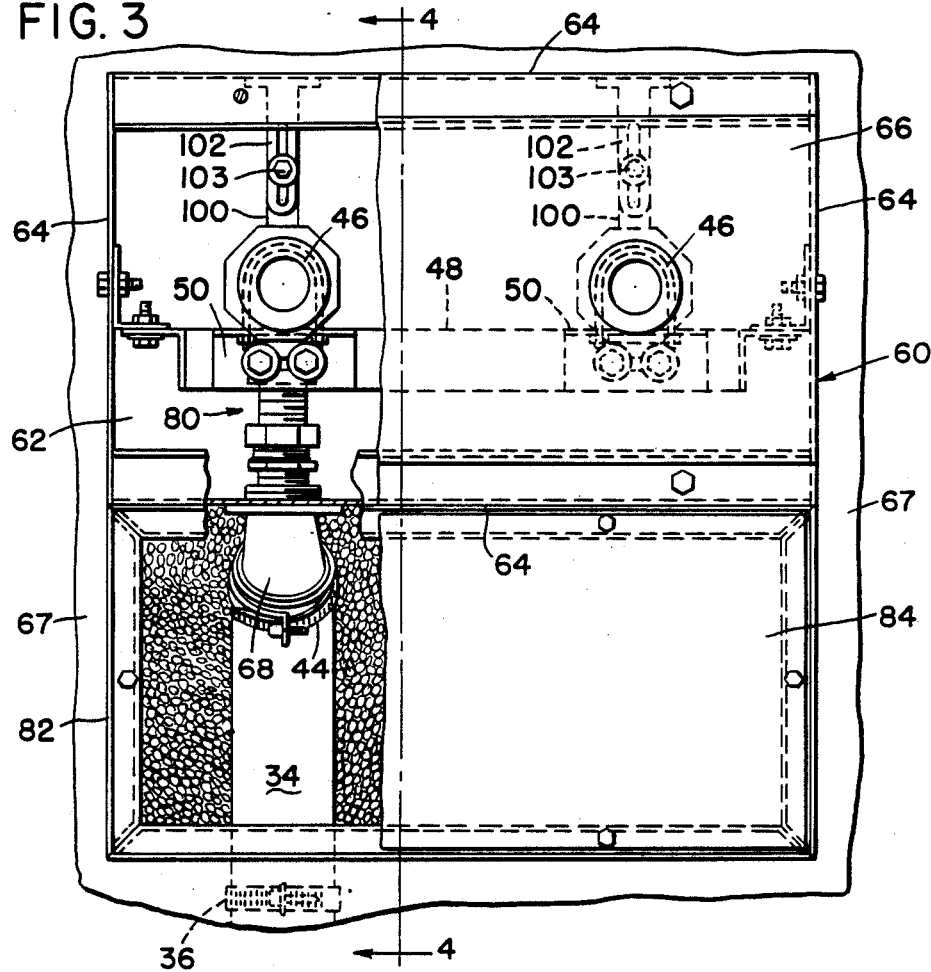
FIG. 3 is a top plan view of a transition piping system according to the present invention.
Figure 4:
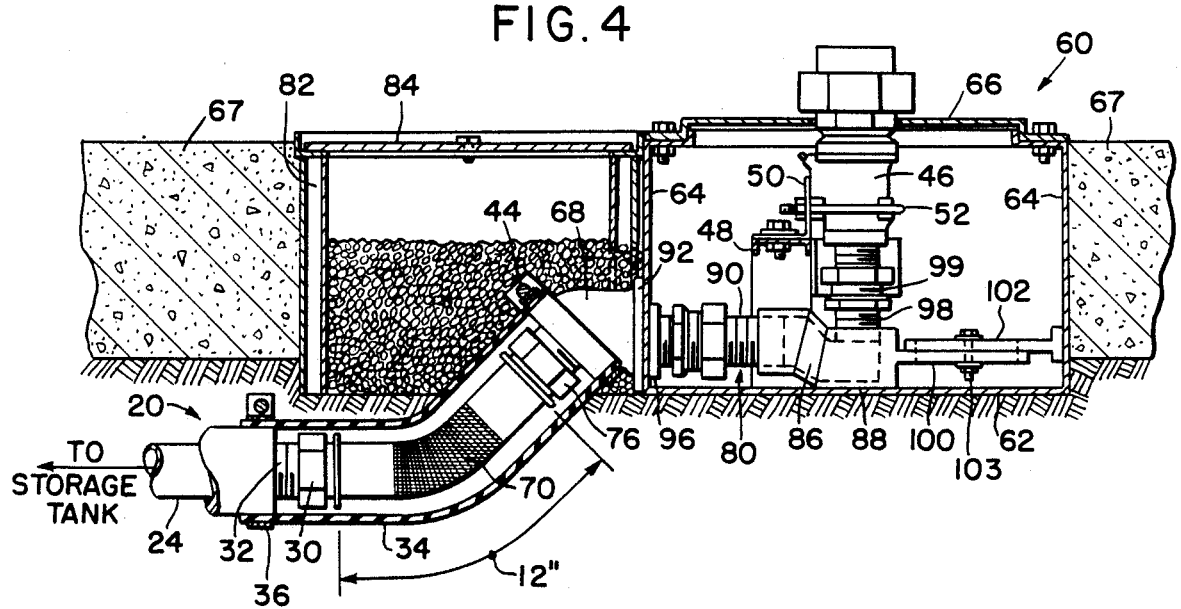
FIG. 4 is a sectional view taken on line 4—4 in FIG. 3.
Figure 5:
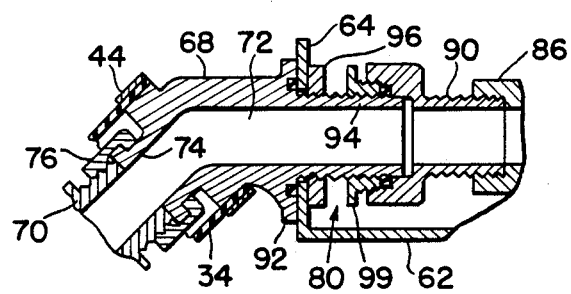
FIG. 5 is a fragmentary sectional view of a portion of the FIG. 3 system.

The arrangement according to the invention, illustrated in FIGS. 3 through 5, avoids the leakage detection problem of the structural arrangement of FIGS. 1 and 2. The liquid spill-containment casing 60 includes a bottom wall 62 and four upstanding side walls 64. A rectangular access plate 66 is removably secured to the upper edges of side walls 64. The casing is embedded in a mass of concrete 67 which is part of an upstanding island which supports a number of fuel pumping units.

A double walled main pipe 20 is located underground below the plane of casing bottom wall 62. The pipe construction is similar to that of pipe 20 shown in FIG. 2. However, pipe 20 (FIG. 4) is relatively near to the plane of casing bottom wall 62, thus to provide visual access to the pipe joint at 30, 32 and 36 by removal of only a minor quantity of earth.

A forty-five degree elbow member 68 is mounted on one of the casing side walls 64 in fluid connection with a semiflexible hose 70. Elbow member 68 defines a passage that includes a horizontal leg 72 (FIG. 5) and a second leg 74 extending downwardly at an acute angle, specifically forty-five degrees in the illustrated construction. A swivel connector 76 is mounted on the upstream end of elbow member 68 to connect the elbow member to semi-flexible hose 70.

Hose 70 and elbow 68 collectively form an S-shaped transition pipe structure wherein the horizontal ends of the structure are interconnected by an upwardly inclined or angled intermediate section. Hose 70 serves as an adjustable elbow to facilitate connection with pipe 24, thus to accommodate some pipe misalignment or displacement from its designated position.

Hose 70 has the same general construction as the aforementioned hose 28 (FIG. 2) except that it is considerably shorter, only about twelve inches in a typical situation. The shorter length is made possible by the transition of the hose upwardly from nominally horizontal pipe 24 through an angle of only approximately forty-five degrees. The elbow member 68 completes the transition into an L-shaped passage structure 80 located within casing 60. The transition piping is located alongside casing 60, rather than below the casing. Therefore, the casing joints at 76 and 32 are accessible from points above ground without extensive earth excavations.

The transition piping is located within an upstanding vertical shroud 82 attached to one of the casing side walls 64. Shroud 82 is a four-sided bottomless structure, wherein the rightmost shroud wall extends only part way downwardly along the adjacent casing side wall 64 in order to provide a free space for accommodating elbow member 68.

An access plate 84 is releasably mounted on the upper edges of the shroud walls to normally conceal the transition piping from view. Gravel or the like may be poured into the space defined by the shroud.

The shroud walls are preferably of double wall construction for flexural strength and stability against deformation when concrete is being poured around the shroud casing 60 assembly. The shroud and casing collectively form a rectangular box structure, as viewed in FIG. 3.

The aforementioned L-shaped passage structure 80 includes a small housing 86 having a flat lower face 88 seated on casing bottom wall 62 to stabilize the passage structure against vertical impact forces. A short horizontal fluid tube 90 extends leftwardly from housing 86 toward elbow member 68. The elbow member includes a peripheral flange 92 seated against the outer surface of the associated casing side wall 64, and a tubular wall 94 extending through the casing wall in alignment with fluid tube 90. A nut 96 is threaded onto wall 94 to clamp elbow member 68 to casing side wall 64. Liquid flow is in the left-to-right direction, as viewed in FIGS. 4 and 5.

A vertical tube 98 extends upwardly from housing 88 in alignment with a vertical axis safety valve 46 which has a construction similar to the safety valve 46 shown in FIG. 2. Normal liquid flow through tube 98 and valve 46 is in the upward direction.

A conventional coupling or "Dresser coupling" 99 interconnects tube 98 and valve 46, and a similar coupling 99 is utilized in the connection shown in FIG. 5. This coupling arrangement includes a compression ring which provides limited rotational and longitudinal adjustment and flexibility in installation, thus enabling more convenient or above-ground tightening and adjustment.

The L-shaped passage structure 80 comprises horizontal tube 90, housing 86, and vertical tube 98. During normal flow action the flowing liquid can exert lateral and vertical forces on the passage structure. To stabilize the passage against impact forces, an extensible-contractible stabilizer mechanism is trained between housing 86 and the rightmost casing wall 64. The stabilizer mechanism includes a slotter bar 100 connected to housing 86, and a slotted bar 102 connected to the casing side wall. A clamp screw 103 extends through the slots in bars 100 and 102 to adjust the effective bar length. The stabilizer mechanism is in horizontal alignment with elbow member 68, thus to resist horizontal forces generated on housing 86 as the liquid changes direction within the housing. Adjustments in the stabilizer bar length accommodate the stabilizer to variations in casing 60 dimensions.

The primary advantage of the FIG. 3 construction is the fact that the transition piping is accessible for inspection and repair purposes. Leaking pipe joints can be detected and repaired without excavating the area around and underneath casing 60. An additional advantage is that the downstream end of main pipe 20 is located only a relatively short distance below the plane of casing bottom wall 62. For a given length pipe 20, the underground gasoline storage tank can be located nearer the earth surface, as compared to the arrangement of FIG. 2.

Figure 6:
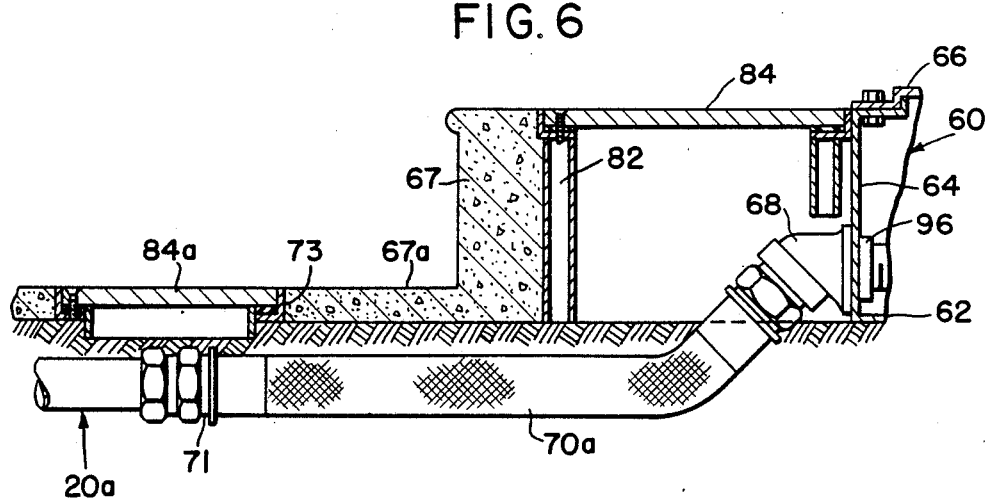
FIG. 6 is a partial sectional view taken in the same direction as FIG. 4, but illustrating another embodiment of the invention.

FIG. 6 illustrates another form of the invention. The passage structure within casing 60 is similar to that of FIGS. 4 and 5. Hose 70a is somewhat longer than the corresponding hose 70 of FIG. 4. Inlet end 71 of hose 70a is located directly below a bottomless access box 73 embedded in the concrete pavement 67a. An access plate 84a is normally positioned in box 73. However, plate 84a is removable when it is desired to inspect the joint between hose 70a and the main pipe section 20a coming from the underground fuel tank. The FIG. 6 arrangement has essentially the same advantages as the FIG. 3 arrangement.

Thus there has been shown and described a novel transition conduit system for fuel pump which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. A transition conduit system for a fuel pumping unit, comprising:
    a casing disposed in a base for a fuel pumping unit, said casing comprising a bottom wall and upstanding side walls for containing spilled fuel,
    a vertically oriented flow valve in the upper section of the casing,
    a first acute-angle elbow passage means on one of said casing side walls to position a first outlet leg of the elbow passage
    to extend horizontally through said one casing side wall, and to position a second inlet leg of the elbow passage to extend at an acute downward angle relative to the first leg,
    an L-shaped passage means in the casing and extending between the horizontal leg of said elbow passage means and the vertically oriented flow valve, and
    a second elbow passage means joined to the second leg of the first elbow passage means, the second elbow passage means including a first upwardly inclined outlet passage section connected to the inlet leg of the first elbow passage means and a second inlet passage section extending essentially horizontally with the second elbow joined to the first elbow.

2. The combination of claim 1, wherein:
    said second leg of the passage in the first elbow is disposed at an angle of about forty-five degrees to the first leg of the passage.

3. The combination of claim 1, wherein:
    said first elbow comprises a peripheral flange seatable against an outer surface of said one casing side wall, and a tubular wall extending from said flange through said one casing side wall.

4. The combination of claim 3, and further comprising:
    a nut threaded onto said tubular wall to clamp said first elbow to said one casing side wall.

5. The combination of claim 1, wherein:

said second elbow comprises a flexible hose.

6. The combination of claim 1, and further comprising:
   a vertical shroud attached to said casing to encircle said first elbow, and
   an access plate extending across the upper edge of said vertical shroud to normally conceal said first elbow.

7. The combination of claim 6, wherein:
   said vertical shroud has approximately the same vertical dimension as said casing and is bottomless to permit said second elbow to extend through and below the shroud lower edge.

8. The combination of claim 7, wherein:
   said casing and vertical shroud collectively form a rectangular box structure in plan view.

9. The combination of claim 8, wherein:
   said vertical shroud is of double walled construction.

10. The combination of claim 1, wherein:
    said L-shaped passage structure includes a housing having a flat lower face seated on the casing bottom wall, a first tube extending horizontally from said housing toward said first elbow, and a second tube extending vertically toward said flow valve.

11. The combination of claim 1, and further comprising:
    means extending between said L-shaped passage structure and a second one of the casing side walls for stabilizing the passage structure against destabilizing forces.

12. The combination of claim 11, wherein:
    said stabilizing means is extensible and contractible in a horizontal direction.

13. The combination of claim 11, wherein said stabilizing means comprises:
    a first slotted bar extending from the passage structure,
    a second slotted bar extending from said second casing side wall, and
    clamp screw means extending through the slots in the two bars.

14. The combination of claim 13, wherein:
    said stabilizing means is in horizontal alignment with said first elbow.

15. A transition conduit system in association for use with a fuel pumping unit, comprising:
    a casing disposed below the pumping unit and underground,
    said casing including a bottom wall and upstanding side walls,
    a nominally horizontal underground fuel flow pipe disposed a short distance below the plane of the casing bottom wall,
    an S-shaped transition pipe extending upwardly from said horizontal pipe to one of the casing side walls and including a semi-flexible pipe section adapted to permit attitude adjustments therein,
    a safety valve disposed in the upper section of the casing, and
    an L-shaped passage structure extending within the casing between the transition pipe and the safety valve.

16. The combination of claim 15, and further comprising:
    a hollow vertical shroud attached to said casing and encircling the transition pipe.

17. The combination of claim 16, wherein:
    said shroud has approximately the same vertical dimension as the casing.

18. The combination of claim 17, wherein:
    the casing and shroud cooperate to form a rectangular box structure in plan view.

19. The combination of claim 17, and further comprising:
    an extensible-contractible stabilizer mechanism trained between the L-shaped passage structure and one of the casing side walls.

20. The combination of claim 16, wherein:
    said semi-flexible pipe section includes an elongated horizontal inlet section and an upwardly angled outlet section.

21. The combination of claim 20, and further comprising:
    an access box positioned above the joint between the underground fuel flow pipe and the inlet end of the transition pipe.

22. The combination of claim 21, wherein:
    said casing and shroud are located within a concrete upstanding island, and said access box is located within a concrete pavement section bordering the island.

* * * * *